(12) United States Patent
Richmond et al.

(10) Patent No.: US 9,214,101 B2
(45) Date of Patent: Dec. 15, 2015

(54) BACKLIT GRAPHIC DISPLAY DEVICE

(71) Applicants: Mark Richmond, Deerfield, IL (US); Christopher W. Pesek, Chicago, IL (US)

(72) Inventors: Mark Richmond, Deerfield, IL (US); Christopher W. Pesek, Chicago, IL (US)

(*) Notice: Subject to any disclaimer, the term of this patent is extended or adjusted under 35 U.S.C. 154(b) by 0 days.

(21) Appl. No.: 14/179,733

(22) Filed: Feb. 13, 2014

(65) Prior Publication Data

US 2014/0223787 A1 Aug. 14, 2014

Related U.S. Application Data

(62) Division of application No. 14/159,690, filed on Jan. 21, 2014.

(60) Provisional application No. 61/764,607, filed on Feb. 14, 2013.

(51) Int. Cl.

| | |
|---|---|
| *G09F 13/04* | (2006.01) |
| *G09F 9/33* | (2006.01) |
| *G09F 13/22* | (2006.01) |
| *G09F 21/04* | (2006.01) |
| *G06F 1/16* | (2006.01) |

(52) U.S. Cl.
CPC .............. *G09F 13/04* (2013.01); *G06F 1/1601* (2013.01); *G09F 9/33* (2013.01); *G09F 13/22* (2013.01); *G09F 21/04* (2013.01)

(58) Field of Classification Search
CPC . G09F 2007/1847; G09F 7/12; G02B 6/0019; G02B 6/0073; G02B 6/0011
See application file for complete search history.

(56) References Cited

U.S. PATENT DOCUMENTS

| | | | | |
|---|---|---|---|---|
| 1,097,922 | A | * | 5/1914 | Feraud ................... 362/217.05 |
| 2,303,988 | A | | 12/1942 | Christensen .................... 40/574 |
| 3,517,245 | A | | 6/1970 | Dickson, Jr. et al. |
| 3,570,158 | A | | 3/1971 | Hackett ........................... 40/452 |
| 3,833,833 | A | | 9/1974 | Nelson ....................... 315/169.3 |
| 4,109,235 | A | | 8/1978 | Bouthors ...................... 340/461 |
| 4,138,620 | A | | 2/1979 | Dickson |
| 4,345,970 | A | | 8/1982 | Radvan et al. |
| 4,420,898 | A | | 12/1983 | Moses |
| 4,443,832 | A | | 4/1984 | Kanamori et al. |
| 4,457,089 | A | | 7/1984 | Phillips, Jr. ..................... 40/544 |
| 4,466,208 | A | | 8/1984 | Logan et al. .................... 40/544 |
| 4,603,065 | A | | 7/1986 | Mori et al. |
| 4,862,153 | A | | 8/1989 | Nakatani et al. |
| 4,863,136 | A | * | 9/1989 | Sanders ........................ 248/490 |
| 4,912,608 | A | | 3/1990 | Lee ............... 362/104 |
| 4,914,348 | A | | 4/1990 | Kameyama et al. |
| 5,005,306 | A | | 4/1991 | Kinstler |
| 5,015,086 | A | | 5/1991 | Okaue et al. .................... 351/44 |

(Continued)

*Primary Examiner* — Gary Hoge
(74) *Attorney, Agent, or Firm* — Christopher J. Scott

(57) ABSTRACT

A graphic display device illuminates interchangeable graphic panels and is mountable to a translucent mounting surface. The graphic display device includes a housing assembly, a light guide assembly, and select device support structure. The housing assembly includes a housing back, a housing front, and peripheral housing edging. Together, the housing back and housing edging define an assembly-receiving volume. The light guide of the light guide assembly is positionable within the assembly-receiving volume for guiding light from the light source in an anterior direction. The device support structure alternatively fasten the graphic display device to a translucent mounting surface or support the device upon a support surface adjacent a window such that the light from the light source is guided in an anterior direction through the window.

18 Claims, 11 Drawing Sheets

(56) References Cited

U.S. PATENT DOCUMENTS

| | | | |
|---|---|---|---|
| 5,181,335 A * | 1/1993 | Todd | 40/606.13 |
| 5,239,450 A | 8/1993 | Wall | 362/104 |
| 5,336,345 A | 8/1994 | Gustafson et al. | |
| 5,390,436 A | 2/1995 | Ashall | 40/546 |
| 5,444,930 A | 8/1995 | Loew | |
| 5,477,433 A | 12/1995 | Ohlund | 362/104 |
| 5,566,384 A | 10/1996 | Chien | |
| 5,718,497 A | 2/1998 | Yokoyama et al. | 362/625 |
| 5,957,564 A | 9/1999 | Bruce et al. | 362/84 |
| 6,014,116 A | 1/2000 | Haynes et al. | 345/1.1 |
| 6,205,690 B1 | 3/2001 | Heropoulos et al. | 40/442 |
| 6,216,373 B1 | 4/2001 | Liao | 40/544 |
| 6,314,669 B1 | 11/2001 | Tucker | 40/448 |
| 6,604,834 B2 | 8/2003 | Kalana | |
| 6,624,570 B1 | 9/2003 | Nishio et al. | |
| 6,637,906 B2 | 10/2003 | Knoerzer et al. | |
| 6,659,617 B1 | 12/2003 | Michael | 362/104 |
| 6,783,259 B1 | 8/2004 | Macedonio | 362/249.12 |
| 6,799,877 B2 | 10/2004 | Watkins et al. | 362/542 |
| 6,942,916 B2 | 9/2005 | Bezenek et al. | |
| 7,001,056 B2 | 2/2006 | Clegg | 362/571 |
| 7,065,909 B2 | 6/2006 | Snyder | 40/544 |
| 7,213,935 B2 | 5/2007 | Lee | 362/104 |
| 7,246,932 B2 | 7/2007 | Burtsev et al. | 362/616 |
| 7,360,926 B2 | 4/2008 | Lee et al. | 362/249.01 |
| 8,240,868 B1 | 8/2012 | Sims | 362/104 |
| 2001/0018809 A1 | 9/2001 | Heropoulos et al. | 40/544 |
| 2001/0030871 A1 | 10/2001 | Anderson et al. | 362/488 |
| 2001/0036354 A1 | 11/2001 | Majors | 386/46 |
| 2002/0148250 A1 | 10/2002 | Pratt | 63/3 |
| 2002/0159245 A1 | 10/2002 | Murasko et al. | 362/84 |
| 2003/0007261 A1 | 1/2003 | Hutzel et al. | 359/838 |
| 2003/0193472 A1 | 10/2003 | Powell | 345/102 |
| 2004/0074966 A1 | 4/2004 | Holzer | |
| 2004/0095741 A1 * | 5/2004 | Chen | 362/31 |
| 2006/0107568 A1 * | 5/2006 | Nicholini et al. | 40/546 |
| 2009/0025264 A1 * | 1/2009 | Daimon et al. | 40/546 |
| 2009/0158629 A1 * | 6/2009 | Bears et al. | 40/546 |
| 2011/0170034 A1 * | 7/2011 | Jeong | 349/61 |

* cited by examiner

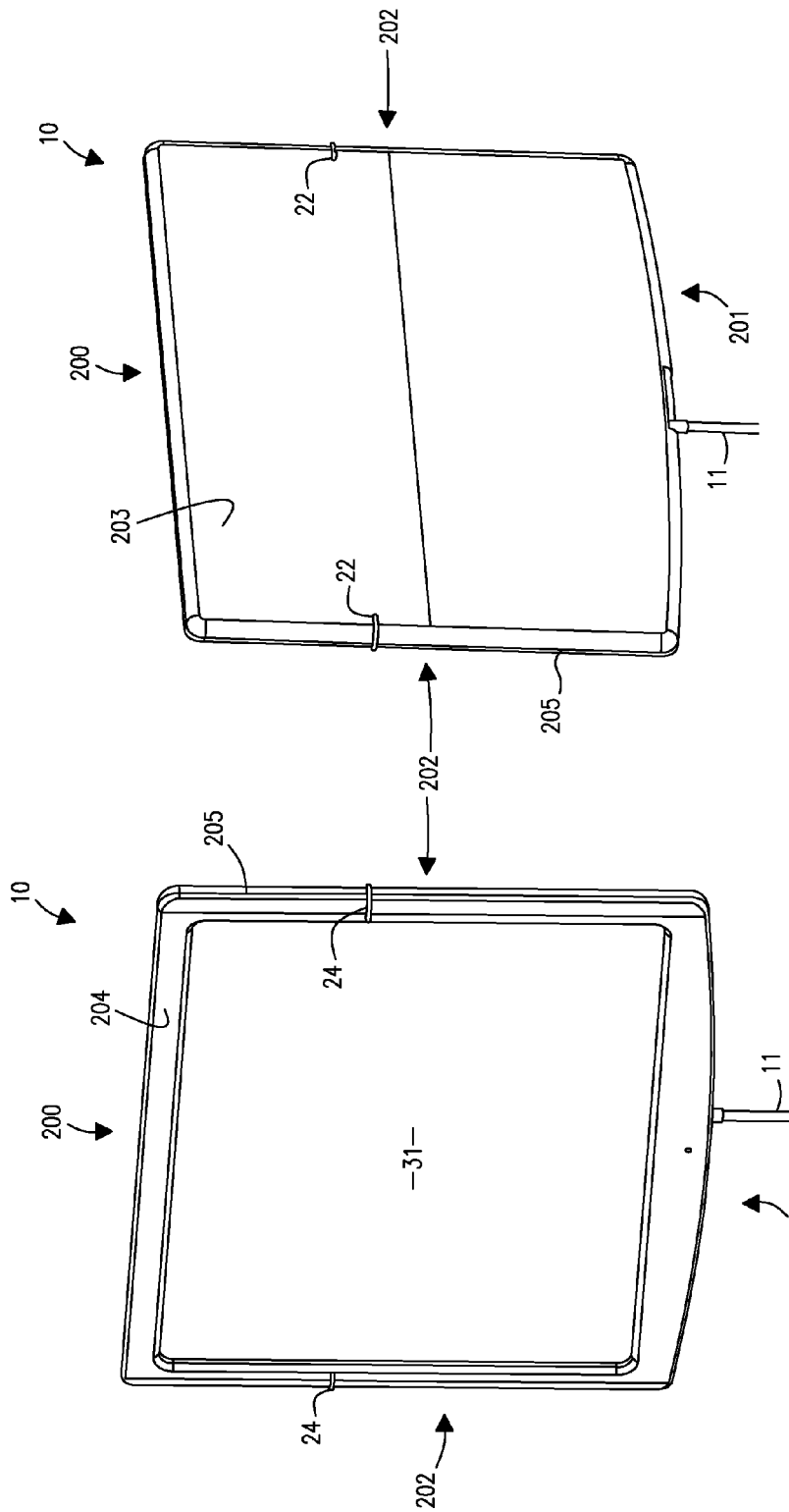

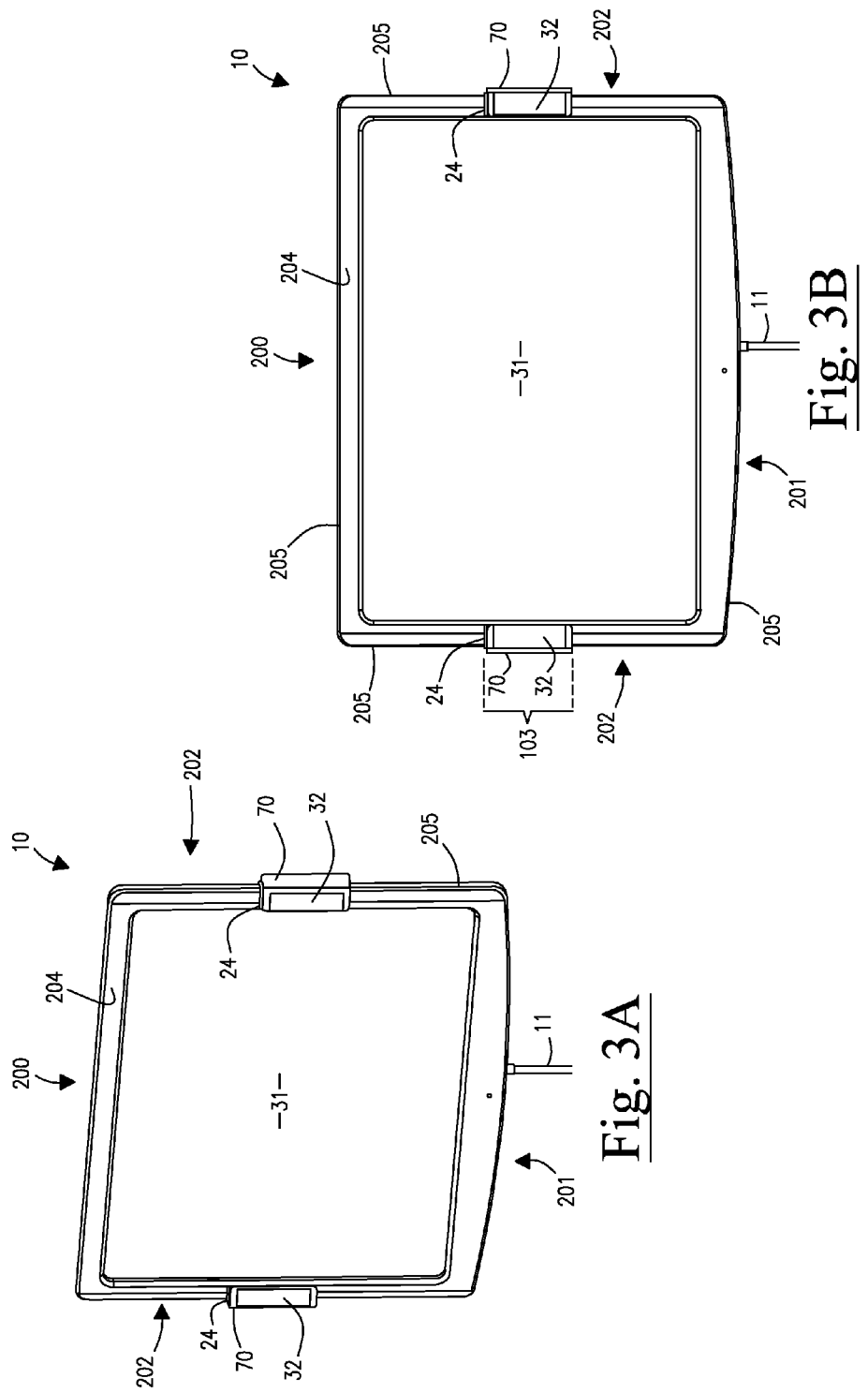

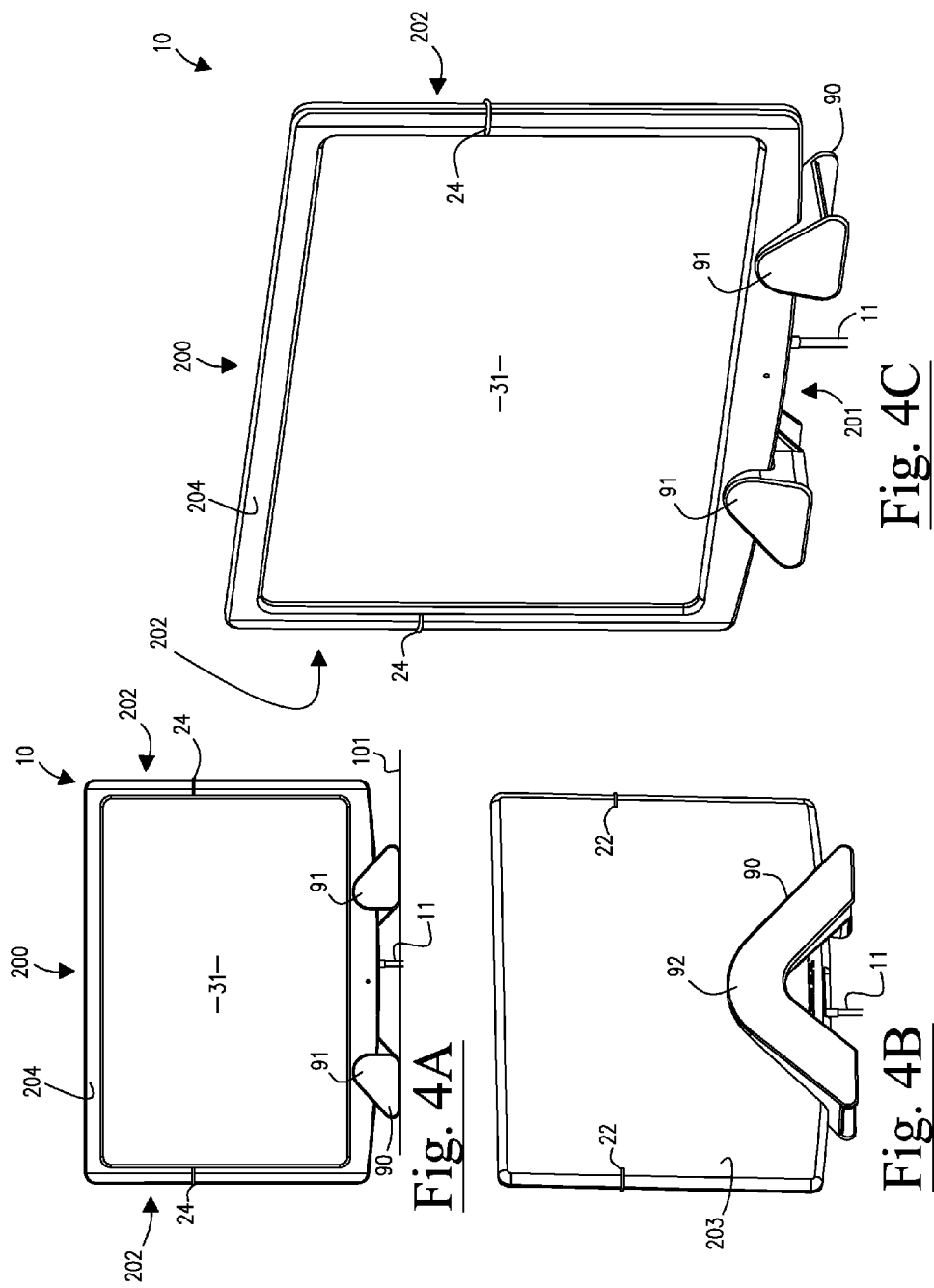

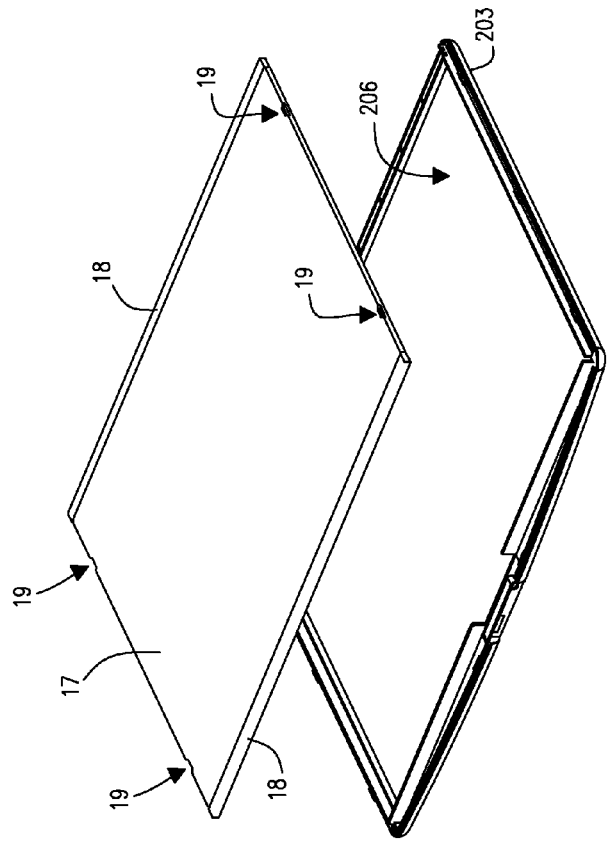
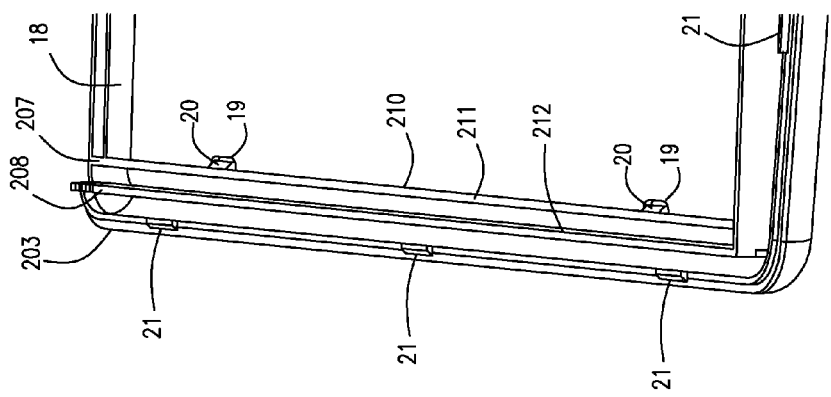

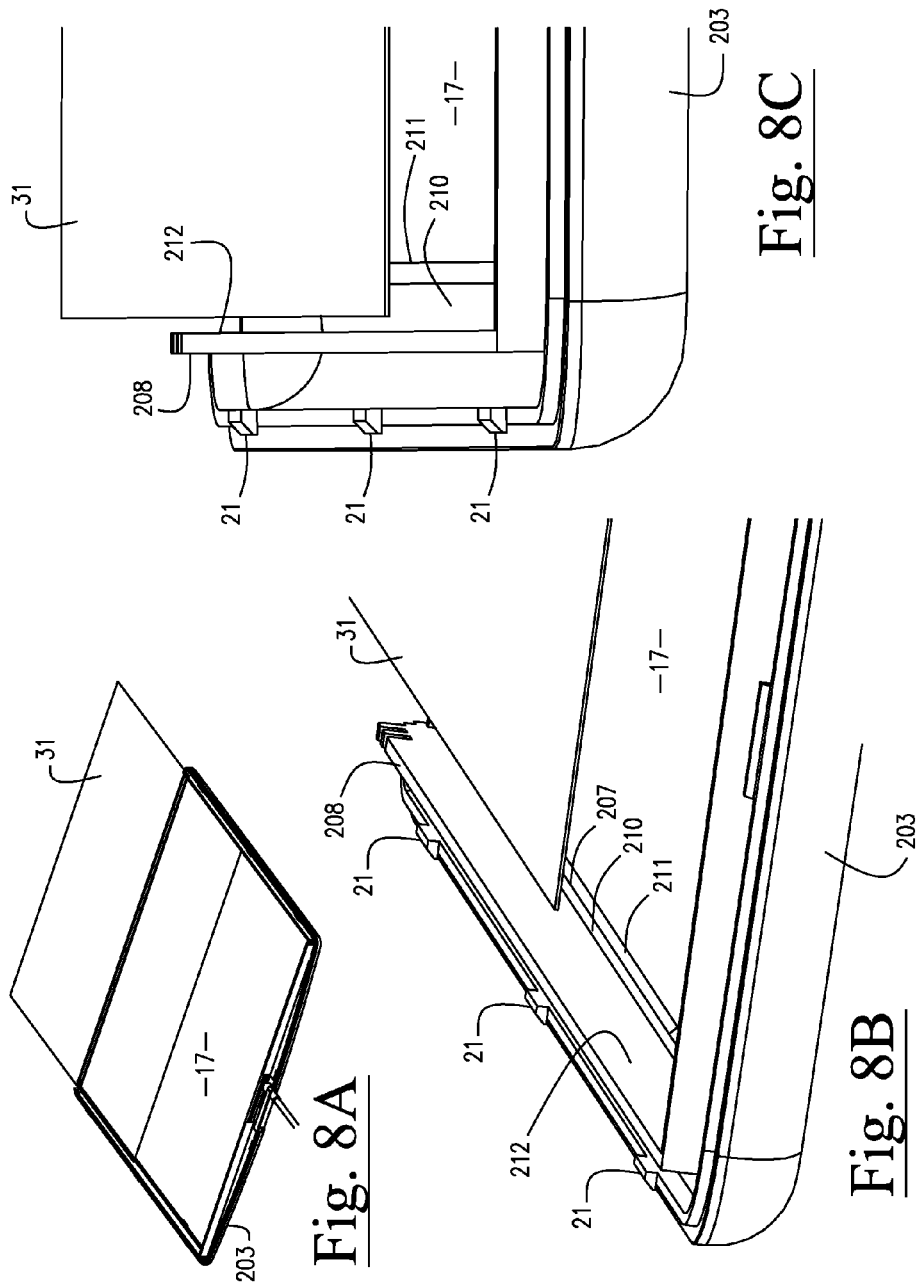

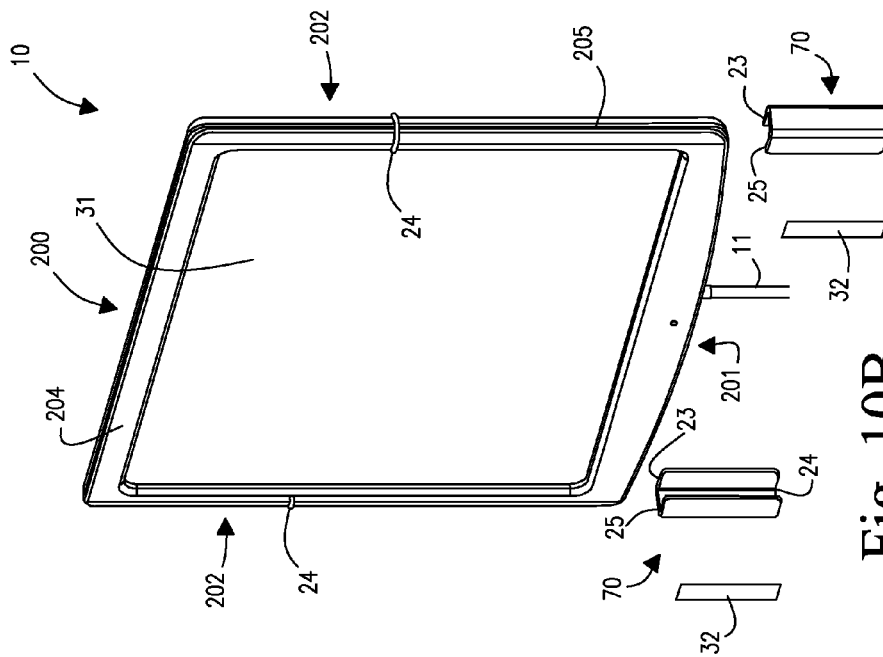
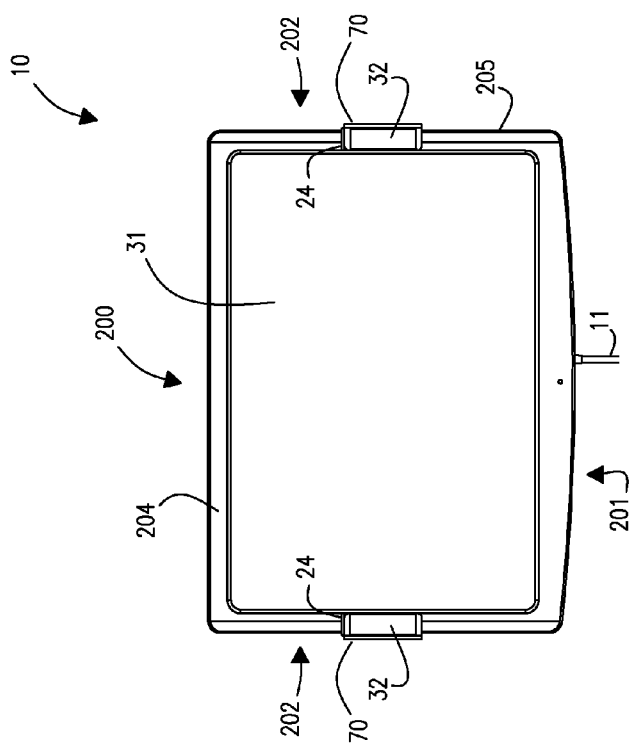
Fig. 10A
Fig. 10B

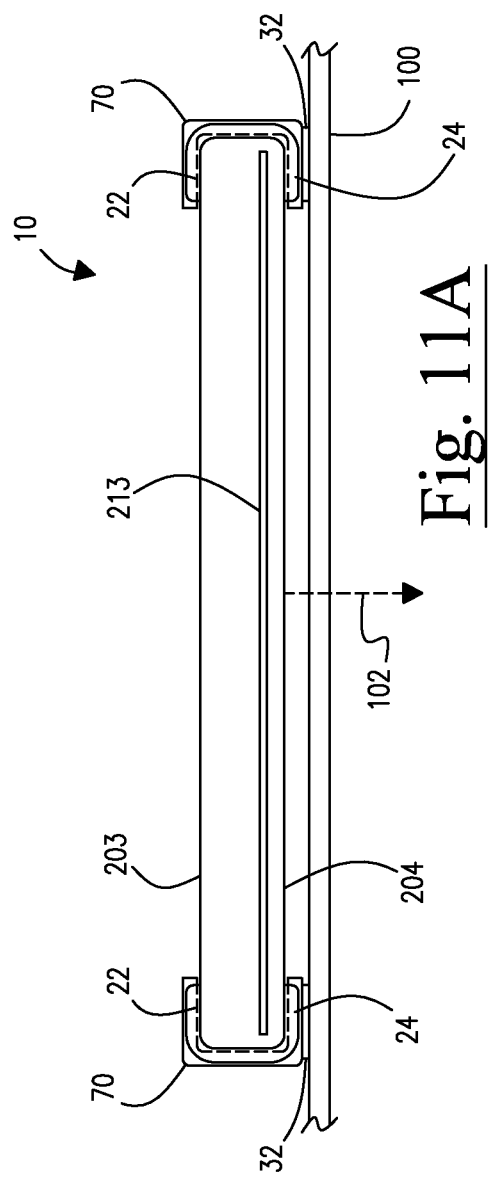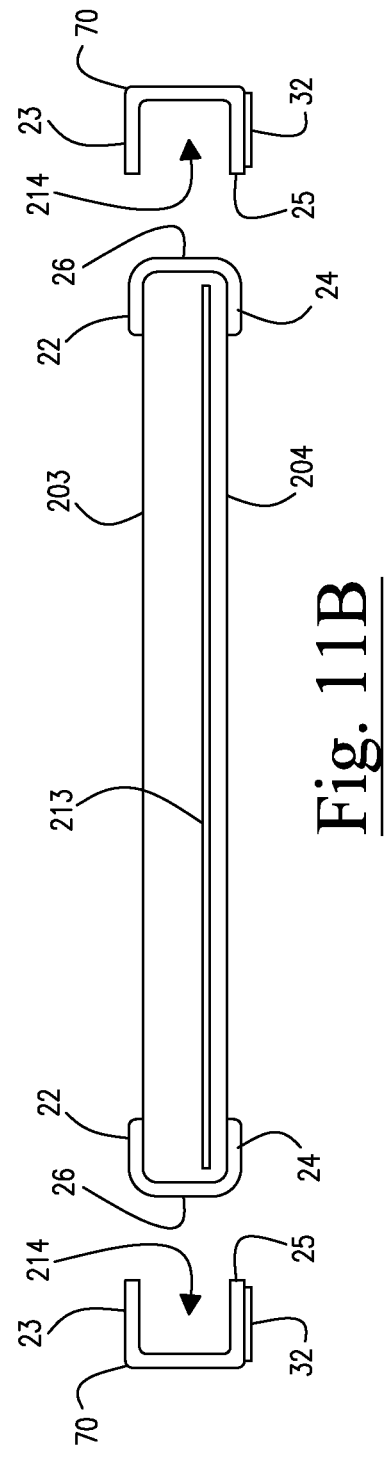

BACKLIT GRAPHIC DISPLAY DEVICE

PRIOR HISTORY

This U.S. patent application is related to and a continuation-in-part patent application of pending U.S. patent application Ser. No. 14/159,690 ('690 application) filed in the United States Patent and Trademark Office (USPTO) on 21 Jan. 2014 to which priority is claimed, and is a non-provisional patent application claiming the benefit of U.S. Provisional Patent Application No. 61/764,607 ('607 application) filed in the USPTO on 14 Feb. 2013. The specifications of the '690 application and the '607 application are hereby incorporated by reference thereto.

BACKGROUND OF THE INVENTION

1. Field of the Invention

This invention relates generally to a light or a lighting device, such as a backlit graphic display device. More particularly, this invention relates to a backlit graphic display device for illuminating a graphics panel, which device can be positioned on or near a window or glass surface, such as within a home.

2. Brief Discussion of Prior Art

Electroluminescent (EL) lamps or devices have been used for signage. There are known methods for manufacturing EL lamps or devices. One conventional emergency exit sign uses an EL lamp in combination with a pilot light which is connected to the EL lamp by way of a photoelectric link. The photoelectric link monitors the brightness of the EL lamp and keeps on the pilot light as long as the EL lamp is lit. Illumination provided by the EL lamp may be less than the illumination of background brightness, making it difficult to tell by looking at the EL lamp whether or not the EL lamp is energized. Thus, the pilot light provides a point of illumination that can be easier to detect than whether the EL lamp is lit. This particular combination can be useful for building inspectors that check the operational status of an exit sign.

Other prior art systems include U.S. Pat. No. 5,390,436 ('436 patent), issued to Ashall, which '336 patent discloses a Display System. The '436 patent describes an edge-lit illuminated display system has a transparent medium having first and second opposing surfaces and at least one edge operable with a light source for illuminating the first and second surfaces. A matrix of dots on each of the surfaces is arranged to allow interaction of light between the surfaces. The matrix of dots on at least one of the surfaces substantially covers the entire surface for providing an even increased illumination throughout the surface, wherein when a graphic image is supported over the surface the graphic image is evenly illuminated.

U.S. Pat. No. 5,718,497 ('497 patent), issued to Yokoyama et al. discloses a Surface Light Source Device. The '497 patent describes a surface light source device comprising a light-conducting member consisting of a sheet of transparent material, a linear light source disposed adjacent to an edge surface of the light-conducting member, a diffusion plate disposed on a front surface of the light-conducting member and a reflective plate disposed on a rear side of the light-conducting member. The rear surface of the light-conducting member has depressions or projections. These depressions or projections have rough surfaces. By selecting the shape of the depressions or projections, and controlling the roughness of the rough surfaces, an enhanced uniform brightness distribution is provided.

U.S. Pat. No. 5,957,564 ('564 patent), issued to Bruce, discloses a Low Power Lighting Display. The '564 patent describes a lighting display comprising a plurality of electroluminescent lamps (ELs) connected in parallel across a rechargeable battery that is connected to the EL's through an inverter. A solar panel device recharges the battery. Electroluminescent lamps for use in light strings are produced by cutting decorative shapes from existing electroluminescent material and mounting them back to back, in receptacles connected to electric wiring as in conventional light strings. For greater protection and ease of use the lamps may be mounted inside a length of clear plastic tubing, or may be laminated within layers of plastic material.

U.S. Pat. No. 6,783,259 ('259 patent), issued to Macedonio, discloses an Apparatus for Recreating and Illuminating a Visual Image. The '259 patent describes an apparatus for recreating and simultaneously illuminating the visual features of a substantially planar visual image using illumination devices, the United States flag being a visual image utilized in one embodiment.

From a review of the foregoing and a consideration of the prior art in general, it will be understood that the prior art perceives a need for a backlit graphic display device for illuminating interchangeable graphic panels for use in residential or place of business settings, which backlit graphic display device comprises a housing assembly, a light guide assembly, and select device-supporting means for supporting the backlit graphic display device in a spatial position such that the light from the light source is guided in a select direction for the benefit of passersby the residential or place of business settings as substantially summarized and described hereinafter.

SUMMARY OF THE INVENTION

The present invention provides a backlit graphic display device. The backlit graphic display device according to the present invention preferably and essentially functions to illuminate interchangeable graphic panels or graphic lenses for applications in residential settings, places of business, and other building constructions having windows for displaying graphics. To achieve this primary objective, the backlit graphic display device according to the present invention preferably and basically comprises a housing assembly, and a light guide assembly.

In a first embodiment, certain especially formed device-to-surface retainer structures or mounts are provided for attaching the device to a mounting surface as exemplified by a window as may be found in a home, business, or similar other similar building construction. The backlit graphic display device may, in a second embodiment, be supported by a device stand should the user wish to refrain from attaching the device to such a window and instead support the device upon a support surface adjacent such a window.

The housing assembly preferably and essentially comprises a housing top, a housing bottom, laterally opposed housing sides, a housing back section, a housing front section, and peripheral housing edging. The housing edging may be formed in any number of shapes, including but not limited to rectangular (or square) shapes as generally depicted throughout the figures submitted in support of these specifications, or may be circular, octagonal, triangular, etc.

The housing back preferably and essentially comprises an assembly-receiving cavity. Laterally opposed lens-guiding ribs bound the assembly-receiving cavity and function to guide a graphic lens when the same is inserted into the device. The lens-guiding ribs may preferably comprise inner ribs and outer ribs. The inner ribs comprise anterior surfacing and medial surfacing. The anterior surfacing of the inner ribs functions to oppose and frictionally engage the posterior surfacing of the graphic lens as it is inserted into the housing assembly. The medial surfacing of the inner ribs laterally bounds the assembly-receiving cavity. The outer ribs generally extend orthogonally relative to the inner ribs in an anterior direction and also comprise medial surfacing. The medial surfacing of the outer ribs laterally bounds a lens-receiving space or volume located in anterior adjacency to the assembly-receiving cavity. The medial surfacing of the outer ribs functions to prevent lateral movement or lateral shifting of the graphic lens when the graphic lens is received in the housing assembly in anterior adjacency to the light guide assembly.

The housing front preferably snaps into fastened engagement with the housing back via front-to-back detents or latches. As a means to further enhance the secure attachment of the housing front to the housing back, adhesives or ultrasonic welding may be preferably utilized. The light guide assembly according to the present invention may be preferably powered by an external power source linked to the device via a power cord, which cord interfaces with the device at a circuit interface, which circuit interface may further preferably comprise an On/Off switch. Conductors electrically communicate the circuit interface to the light source as preferably exemplified by opposed LED strips or light strips.

The preferred light source is thus exemplified by LED type light elements as outfitted into strips, which strips are powered by circuitry as exemplified by conductor(s), terminals, a PC board, a control module, an optional, manually operable switch, and/or an on/off/mode switch. The light strips are preferably attached to a light guide panel via covers, which covers are preferably U-shaped in transverse cross-section and basically function to simultaneously cover the light source or strips and fasten the light source or strips in edge adjacency to the light guide panel. The light source covers thus help retain the light guide assembly in assembled relation within the assembly-receiving cavity.

The light guide assembly preferably comprises a light guide panel or light guide as outfitted with the light strips and light strip covers and is positionable within the assembly-receiving cavity. The external power source delivers power to the light strips via the power cord through the circuit interface and conductors for powering and illuminating the LED's of the light strips such that light emanating from the strips enters the edging of the light guide panel, and is re-directed in an anterior direction orthogonal to a light guide plane of the (planar) light guide panel.

The light guide assembly according to the present invention may further preferably and essentially comprise a light trap, which light trap is preferably positionable in anterior adjacency to the light guide panel within the lens-receiving section or volume for enhancing uniform light transmission from the light guide panel. Further, the light guide panel may be outfitted with depressions, which depressions are cooperable with detents integrally formed with and extending medially from the medial surfacing of the inner ribs. It will thus be understood that the assembly-receiving cavity and the light guide assembly preferably comprise certain cooperable assembly-to-cavity retention means for retaining the light guide assembly within the assembly-receiving cavity when received therein.

As noted, the primary function of the backlit graphic display device is to illuminate a graphic lens or graphic panel with light directed anteriorly. In this regard, the device may preferably comprise, in combination, an interchangeable graphic lens. The graphic lens is insertable into the housing assembly via a lens-receiving slot formed intermediate the housing back and housing front at the housing top. The graphics panel or graphic lens as depicted in the illustrations appended to these specifications may be preferably outfitted with LOGO's or other fanciful depictions as representative of the types of visual information that may be displayed upon the graphics panel for the amusement of passersby.

Somewhat central to the practice of the present invention are the device-to-surface retainer structures or mounts. The device-to-surface retainer structures or mounts are preferably and essentially laterally opposed relative to the housing assembly for fastening the backlit graphic display assembly 10 to a mounting surface as exemplified by a window in a home or business. The device-to-surface retainer structures each preferably comprise an edge-receiving opening or void.

The edge-receiving voids receive and bind to or retain the laterally opposed portions of the peripheral housing edging. The retainer structures thus function to both receive and support the housing assembly such that the light from the light source(s) is guided in the anterior direction, which direction is orthogonal to a plane of a mounting surface as exemplified by a home or business window.

The mounts are preferably outfitted with adhesion elements or layers, which adhesion elements or layers comprise a first surface that adhesively contacts an anterior surface of element, and a second surface that adhesively contacts a support or mounting surface, such as a business front or home window. Adhesion elements or layers can be of any suitable clear or translucent adhesive. Adhesion elements may include a suitable adhesive component or layer to removably secure the backlit graphic display device to the mounting surface so that backlit graphic display device is securely mounted to the mounting surface when in use.

The adhesion elements further enable selective removal of the mounts from the mounting surface without damage to adhesion element and/or the mounting surface. It is contemplated, however, that other suitable components, such as suction cups, brackets, other adhesives, static cling devices, screws, wire, hook-and-loop fasteners and/or any other mechanical, electrical and/or magnetic connector can be used to mount backlit graphic display device 10 with respect to a mounting structure or surface.

The backlit graphic display device may further preferably and essentially comprise a housing back that comprises integrally formed, laterally opposed, posteriorly extending retainer-engaging projections or protuberances. The retainer-engaging projections or protuberances essentially function as stop structure for engaging upper rearward portions of the retainer structures. The retainer-engaging projections and retainer structures enhance support of the housing assembly adjacent the mounting surface. The retainer-engaging projections or protuberances may preferably be formed at a point relatively nearer the housing top as compared to the housing bottom at the housing edging of the housing assembly.

The graphic display device further preferably comprises a housing front that comprises integrally formed, laterally opposed, anteriorly-extending retainer-engaging projections, which anteriorly-extending retainer-engaging projections engage upper anterior portions of the retainer structures. The retainer-engaging projections and retainer structures further enhance support of the housing assembly adjacent the mounting surface.

The anteriorly-extending retainer-engaging projections and the posteriorly-extending projections are preferably integrally formed or connected so as to form U-shaped, laterally extending projections. The retainer structures are thus also preferably U-shaped in transverse cross-section for cooperably engaging the U-shaped, laterally extending projections and for enhancing support of the housing assembly adjacent the mounting surface.

The U-shaped, laterally extending projections are preferably formed at laterally opposed portions of the peripheral housing edging relatively nearer the housing top as compared to the housing bottom. The retainer structures each comprise a retainer structure length as at, which retainer structure lengths are equidistant intermediate the housing top and housing bottom when in engagement with the U-shaped, laterally extending projections for enhancing support of the housing assembly adjacent the mounting surface. The described equidistant placement of the structural lengths intermediate the housing top and the housing bottom provides for better balance of the device when mounted to the mounting surface, and thus is believed to enhance support of the housing assembly adjacent the window or mounting surface.

As indicated, the backlit graphic display device can be mounted with respect to a mounting surface window to display desired graphics for marketing applications, safety applications and/or emergency situations, for example. The backlit graphic display device according to the present invention can provide highly visible graphics that other motorists and/or pedestrians and/or bystanders and/or passersby will be able to see in adverse weather conditions, for example.

It is noted that certain users may wish to refrain from attaching the device to a mounting surface as exemplified by a window. In this regard, the device further contemplates the incorporation of certain select device-supporting means, which select device-supporting means may well function to support the graphic display device adjacent a window such that the light from the light source is guided in the anterior direction. The select device-supporting means may be preferably selected from the group consisting of device-to-surface retainer structures for fastening the graphic display device to a mounting surface and a device stand structure.

The device stand according to the present invention preferably comprises laterally opposed anterior housing support members and a posterior housing support member. The housing assembly is received intermediate the anterior housing support members and the posterior housing support member when supported via the device stand upon a support surface. The anterior housing support members and the posterior housing support member are preferably triangularly shaped for enhancing support of the housing assembly upon the support surface.

Other readily identifiable objects and structural features of the present invention will become more evident from a consideration of the drawings submitted in support of these specifications as briefly summarized hereinafter.

BRIEF DESCRIPTION OF THE DRAWINGS

Other features of our invention will become more evident from a consideration of the following brief descriptions of patent drawings:

FIG. 1A is a first frontal or anterior perspective view of a backlit graphic display device according to the present invention showing a fragmentary power cord extending from the housing bottom of the device.

FIG. 1B is a first rear or posterior perspective view of the backlit graphic display device according to the present invention showing a fragmentary power cord extending from the housing bottom of the device.

FIG. 3A is a third frontal or anterior perspective view of the backlit graphic display device according to the present invention showing a fragmentary power cord extending from the housing bottom of the device and outfitted with laterally opposed device-to-surface retainer structures.

FIG. 3B is a first frontal or anterior plan type view of the backlit graphic display device according to the present invention showing a fragmentary power cord extending from the housing bottom of the device and outfitted with laterally opposed device-to-surface retainer structures.

FIG. 4A is a second frontal or anterior plan type view of the backlit graphic display device according to the present invention showing a fragmentary power cord extending from the housing bottom of the device and supported by a device stand structure.

FIG. 4B is a second rear or posterior perspective type view of the backlit graphic display device according to the present invention showing a fragmentary power cord extending from the housing bottom of the device and supported by the device stand structure.

FIG. 4C is a fourth frontal or anterior perspective view of the backlit graphic display device according to the present invention showing a fragmentary power cord extending from the housing bottom of the device and supported by the device stand structure.

FIG. 6A is a fragmentary anterior perspective view of a housing back with light guide assembly received in the assembly-receiving cavity of the housing back showing cooperable depressions and detents for fastening the light guide assembly in the assembly-receiving cavity.

FIG. 6B is a bottom anterior perspective view of the light guide assembly as exploded from the housing back.

FIG. 8A is a reduced bottom anterior perspective type view of a graphic lens panel being received in anterior adjacency to the light guide panel as received in the assembly-receiving cavity of the housing back.

FIG. 8B is a first fragmentary enlarged sectional view as sectioned from FIG. 8A to show in greater detail the graphic lens panel being received in anterior adjacency to the light guide panel as received in the assembly-receiving cavity of the housing back.

FIG. 8C is a second fragmentary enlarged sectional view of the structures otherwise shown in FIG. 8B being rotated to show in edge perspective and greater detail the graphic lens panel being received in anterior adjacency to the light guide panel as received in the assembly-receiving cavity of the housing back.

FIG. 10A is a third frontal or anterior plan type view of the backlit graphic display device according to the present invention showing a fragmentary power cord extending from the housing bottom of the device and outfitted with laterally opposed device-to-surface retainer structures.

FIG. 10B is a fifth frontal or anterior perspective type view of the backlit graphic display device according to the present invention showing a fragmentary power cord extending from the housing bottom of the device with laterally opposed device-to-surface retainer structures exploded from the backlit graphic display device.

FIG. 11A is a top edge view of the backlit graphic display device according to the present invention shown attached to a fragmentary mounting surface.

FIG. 11B is a top edge view of the backlit graphic display device according to the present invention shown with laterally opposed device-to-surface retainer structures exploded from the backlit graphic display device.

DETAILED DESCRIPTION OF THE PREFERRED EMBODIMENT

Figure 2A:
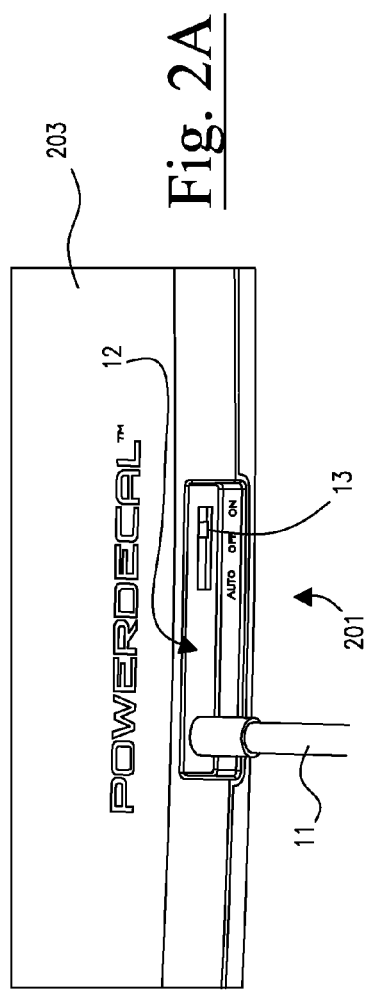
FIG. 2A is a fragmentary enlarged view of a circuit interface site at the housing bottom of the housing back showing a fragmentary power cord extending from the circuit interface site located at the housing bottom of the device.

The present invention provides a backlit graphic display device as depicted and referenced at 10. The backlit graphic display device 10 according to the present invention preferably and essentially functions to illuminate interchangeable graphic panels or graphic lenses as at 31 primarily for use in fixed building constructions such as residential homes and places of business. To achieve these primary objectives, the backlit graphic display device 10 according to the present invention preferably and basically comprises a housing assembly, and a light guide assembly housed within the housing assembly.

In a first embodiment or assemblage of components, certain especially formed device-to-surface retainer structures or mounts as at 70 are provided for attaching the backlit graphic display device 10 to a mounting surface as exemplified by a window 100 as may be found in a home, business, or similar other similar building construction. The backlit graphic display device 10 may alternatively, in a second embodiment, be supported by a device stand as at 90 should the user wish to refrain from attaching the backlit graphic display device 10 to such a window 100 and instead support the device 10 upon a support surface 101 adjacent such a window 100.

The housing assembly according to the present invention preferably and essentially comprises a housing top as at 200, a housing bottom as at 201, laterally opposed housing sides as at 202, a housing back section as at 203, a housing front section as at 204, and peripheral housing edging 205. The housing edging 205 may be formed in any number of shapes, including but not limited to rectangular (or square) shapes as generally depicted throughout the figures submitted in support of these specifications, or may be circular, octagonal, triangular, etc.

The housing back 203 preferably and essentially comprises or defines an assembly-receiving cavity or void as at 206. Laterally opposed lens-guiding ribs bound the assembly-receiving cavity 206 and function to guide a graphic lens or graphics panel 31 when such a graphic lens 31 is inserted into the backlit graphic display device 10. The lens-guiding ribs may preferably comprise inner ribs 207 and outer ribs 208. The inner ribs 207 comprise anterior surfacing 210 and medial surfacing as at 211. The anterior surfacing 210 functions to oppose and frictionally engage posterior surfacing of the graphic lens 31 as it is inserted into the housing assembly. The medial surfacing 211 of the inner ribs 207 laterally bounds the assembly-receiving cavity 206.

The outer ribs 208 generally extend orthogonally in an anterior direction relative to the inner ribs 207 and comprise medial surfacing as at 212. The medial surfacing 212 of the outer ribs 208 laterally bounds a lens-receiving space or volume located in anterior adjacency to the assembly-receiving cavity 206 (and light guide assembly when the light guide assembly is received in the assembly-receiving cavity 206). The medial surfacing 212 of the outer ribs 208 functions to prevent lateral movement or lateral shifting of the graphic lens 31 when the graphic lens 31 is received in the housing assembly in anterior adjacency to the light guide assembly.

The housing front as at 204 preferably snaps into fastened engagement with the housing back 203 via front-to-back detents or latches as at 21. As a means to further enhance the secure attachment of the housing front 204 to the housing back, adhesives or ultrasonic welding may be preferably utilized. When the housing front 204 is fastened to the housing back 203, an upper slot 213 is formed at the seam between the housing front 204 and housing back 203, which slot 213 functions to receive the graphic lens or graphics panel 31.

The light guide assembly according to the present invention may be preferably powered by an external power source linked to the backlit graphic display device 10 via a power cord as at 11, which cord 11 interfaces with the backlit graphic display device 10 at a circuit interface 12, and which circuit interface 12 may further preferably comprise an On/Off switch as at 13. Conductors as at 14 and 15 electrically communicate the circuit interface 12 to the light source as preferably exemplified by opposed LED strips or light strips as at 16.

The preferred light source is thus exemplified by LED type light elements as outfitted into strips 16, which strips 16 are powered by circuitry as exemplified by conductor(s) 14 and 15, terminals, a PC board, a control module, an optional, manually operable switch, and/or an on/off/mode switch as at 13. The light strips 16 are preferably attached to a light guide panel 17 via light strip covers 18, which light strip covers 18 are preferably U-shaped in transverse cross-section and basically function to simultaneously cover the light source or strips 16 and fasten the light source or strips 16 in edge adjacency to the light guide panel 17. The light source covers 18 further help retain the light guide assembly in assembled relation within the assembly-receiving cavity 206.

The light guide assembly preferably comprises a light guide panel or light guide as at 17 as outfitted with the light strips 16 and light strip covers 18 and is positionable within the assembly-receiving cavity 206. The external power source delivers power to the light strips via the power cord 11 through the circuit interface 12 and conductors 14 and 15 for illuminating the LED's of the light strips 16 such that light emanating from the strips 16 enters the edging of the light guide panel 17, and is re-directed in an anterior direction as at 102, which anterior direction 102 is orthogonal to a light guide plane of the (planar) light guide panel 17.

The light guide assembly according to the present invention may further preferably and essentially comprise a light trap (not specifically illustrated), which light trap is preferably positionable in anterior adjacency to the light guide panel 17 within the lens-receiving space or volume for enhancing uniform light transmission from the light guide panel 17.

The light guide panel 17 is preferably outfitted with depressions as at 19, which depressions 19 are cooperable with detents 20 integrally formed with and extending medially from the medial surfacing 211 of the inner ribs 207. It will thus be understood that the assembly-receiving cavity 206 and the light guide assembly preferably comprise certain cooperable assembly-to-cavity retention means (as exemplified by matable structures 19 and 20) for retaining the light guide assembly within the assembly-receiving cavity 206 when received therein.

The primary function of the backlit graphic display device 10 is to illuminate a graphic lens or graphic panel 31 with light directed anteriorly as at 102. In this regard, the backlit graphic display device 10 may preferably comprise, in combination, at least one interchangeable graphic lens as at 31. The graphic lens 31 is insertable into the housing assembly via the lens-receiving slot 213 formed intermediate the housing back 203 and housing front 204 at the housing top 200. The graphics panel 31 as depicted in the illustrations appended to these specifications may be preferably outfitted with LOGO's or other fanciful depictions as representative of the types of visual information that may be displayed upon the graphics panel 31 for amusement or for information delivery purposes to passersby.

Somewhat central to the practice of the present invention are the device-to-surface retainer structures or mounts as at 70. The device-to-surface retainer structures or mounts 70 are preferably and essentially laterally opposed relative to the housing assembly for fastening the backlit graphic display assembly 10 to a mounting surface as exemplified by a window 100 in a home or business. The device-to-surface retainer structures 70 each preferably comprise an edge-receiving opening or void as at 214. The edge-receiving voids 214 receive and bind to or retain the laterally opposed portions of the peripheral housing edging 205 as at portions 202. The retainer structures 70 thus function to both receive and support the housing assembly such that the light from the light source(s) is guided in the anterior direction 102, which direction 102 is orthogonal to a plane of a mounting surface as exemplified by a home or business window as at 100.

The mounts 70 are preferably outfitted with adhesion elements or layers as at 32, which adhesion elements or layers 32 comprise a first surface that adhesively contacts an anterior surface of element 70, and a second surface that adhesively contacts a support or mounting surface such as a business front or home window 100. Adhesion elements or layers 32 can be of any suitable clear or translucent adhesive. Adhesion elements 32 may include a suitable adhesive component or layer to removably secure the backlit graphic display device 10 to the mounting surface 100 so that backlit graphic display device 10 is securely mounted to the mounting surface when in use.

The adhesion elements 32 further enable selective removal of the mounts 70 from the mounting surface without damage to adhesion element 32 and/or the mounting surface. It is contemplated, however, that other suitable components, such as suction cups, brackets, other adhesives, static cling devices, screws, wire, hook-and-loop fasteners and/or any other mechanical, electrical and/or magnetic connector can be used to mount backlit graphic display device 10 with respect to a mounting structure or surface 100.

The backlit graphic display device 10 may further preferably and essentially comprise a housing back 203 that comprises integrally formed, laterally opposed, posteriorly extending retainer-engaging projections or protuberances as at 22. The retainer-engaging projections or protuberances 22 essentially function as stop structure for engaging upper rearward portions 23 of the retainer structures 70. The retainer-engaging projections 22 and retainer structures 70 enhance support of the housing assembly adjacent the mounting surface 100. The retainer-engaging projections or protuberances 22 may preferably be formed at a point relatively nearer the housing top 200 as compared to the housing bottom 201 at the housing edging 205 of the housing assembly as generally depicted in FIGS. 1B, 4B, 11A, and 11B.

Figure 2B:
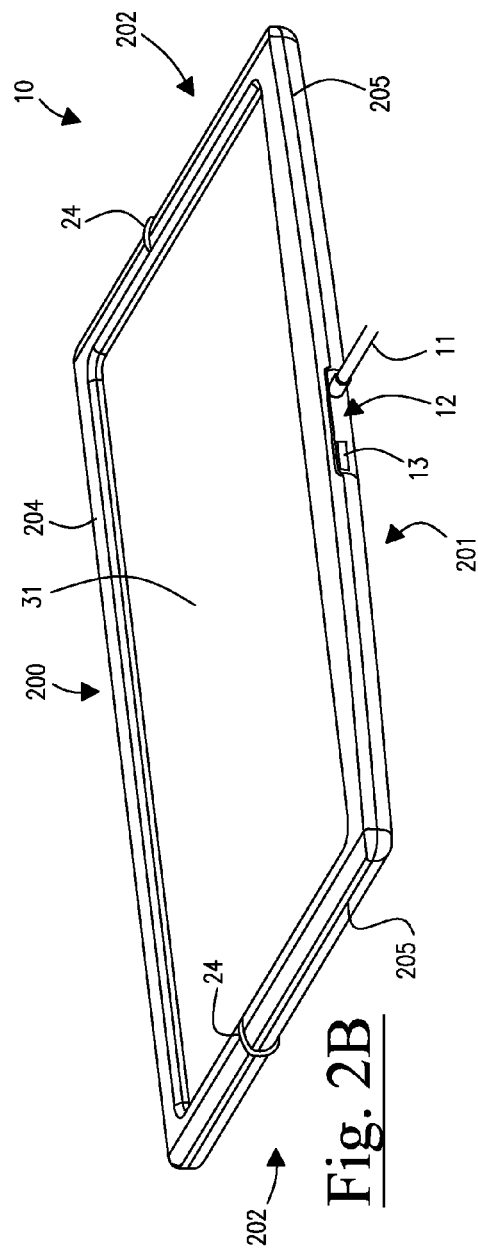
FIG. 2B is a second frontal or anterior (bottom) perspective view of a backlit graphic display device according to the present invention showing a fragmentary power cord extending from the housing bottom of the device.
Figure 5:
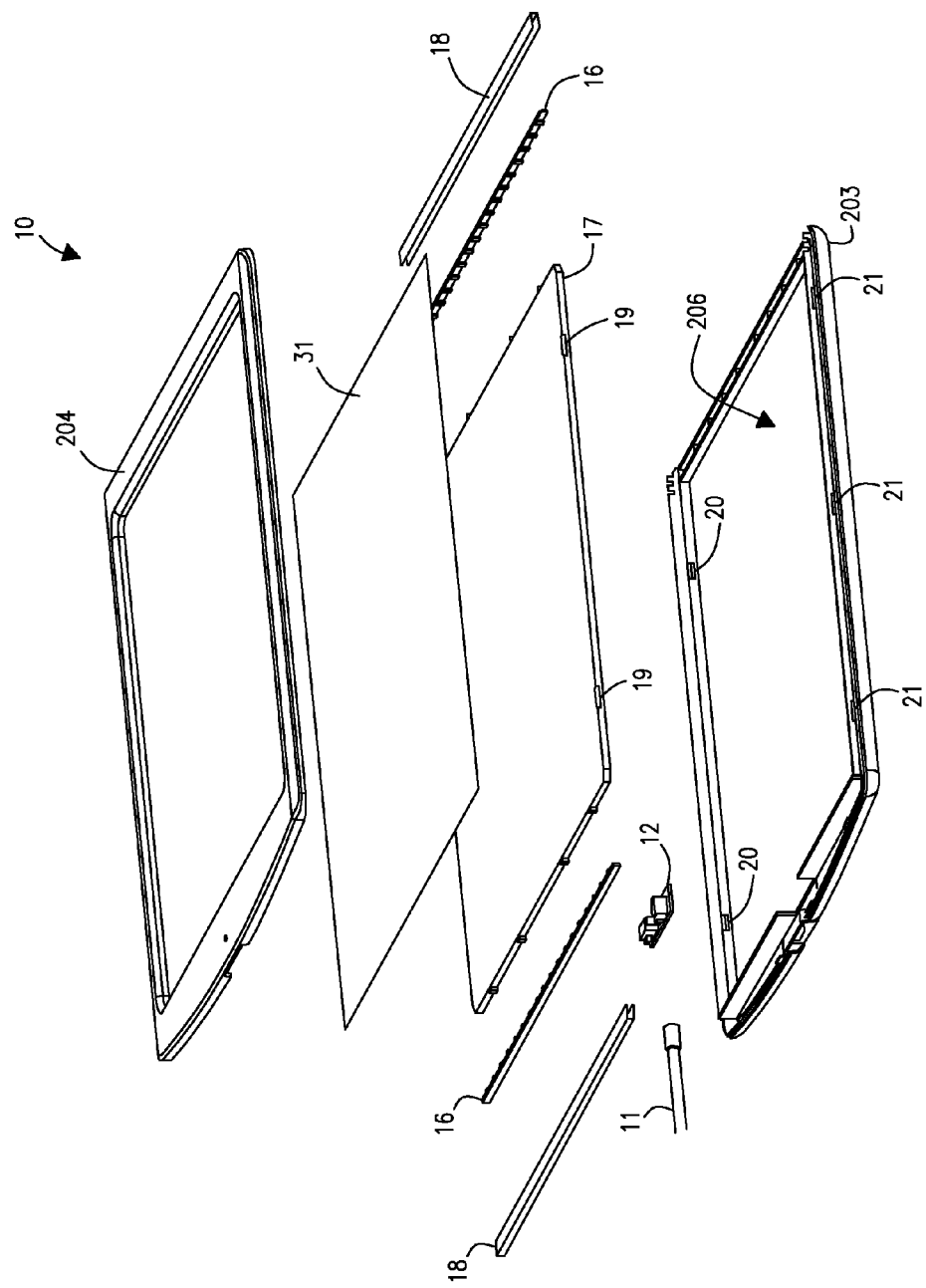
FIG. 5 is an exploded bottom perspective view of the backlit graphic display device according to the present invention showing a fragmentary power cord extending from the housing bottom of the device.
Figure 7:
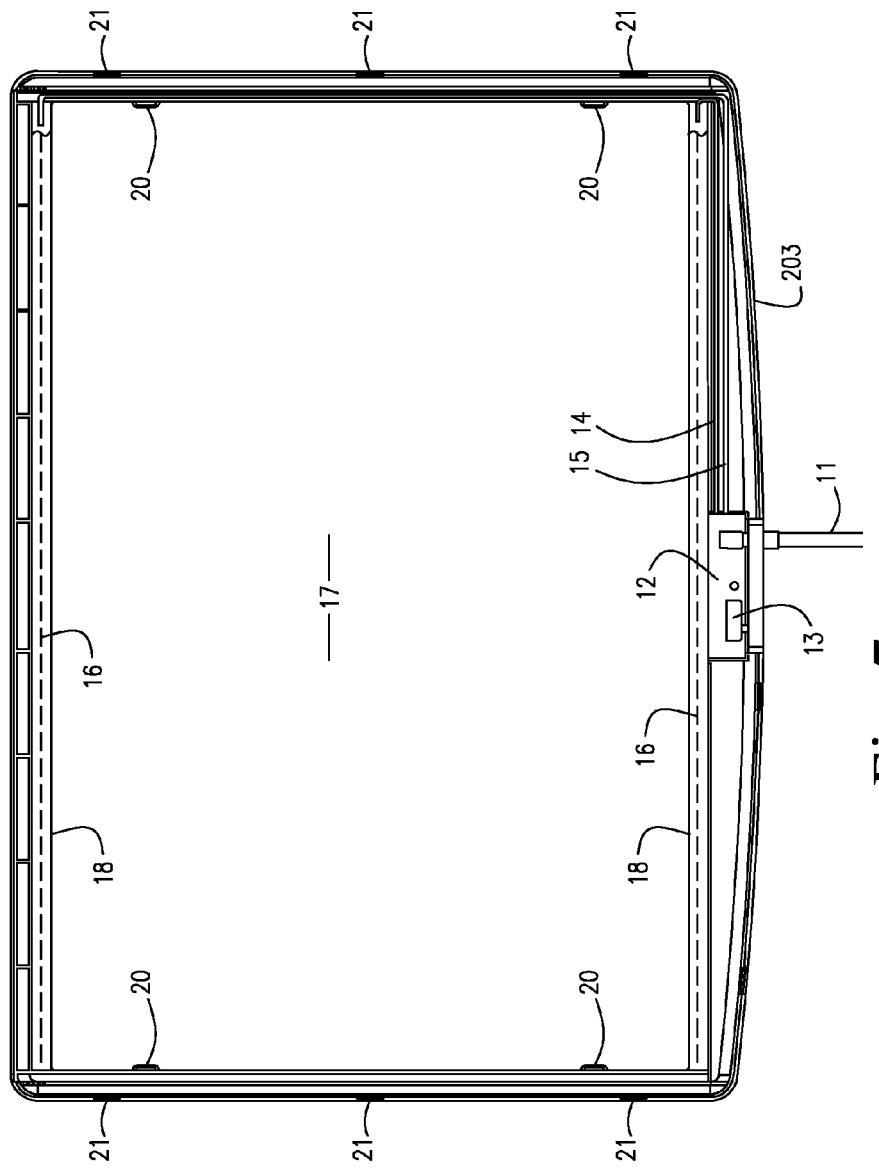
FIG. 7 is a frontal or anterior plan type view of the light guide assembly received in the assembly-receiving cavity of the housing back.
Figure 9B:
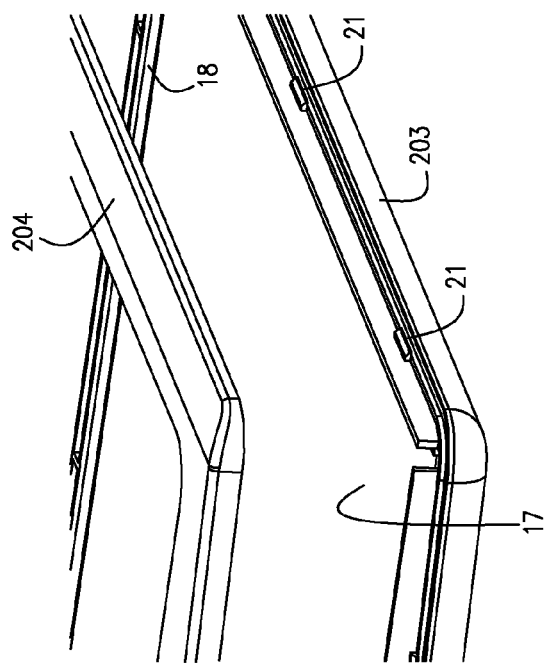
FIG. 9B is a reduced bottom frontal or anterior perspective view of the housing front as exploded from the housing back.
Figure 9A:
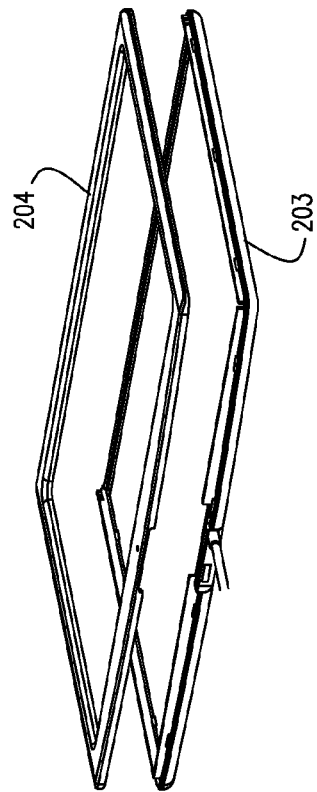
FIG. 9A is a fragmentary enlarged sectional view of the structures otherwise shown in FIG. 9B to show in greater detail the interface intermediate the housing front and housing back.

Referencing FIGS. 1A, 2B, 3A, 3B, 4A, 4C, 10A, 10B, 11A, and 11B, the reader will further note that the graphic display device 10 preferably comprises a housing front 204 that comprises integrally formed, laterally opposed, anteriorly-extending retainer-engaging projections 24, which anteriorly-extending retainer-engaging projections 24 engage upper anterior portions 25 of the retainer structures 70. The retainer-engaging projections 24 and retainer structures 70 further enhance support of the housing assembly adjacent the mounting surface.

As perhaps is most clearly seen in FIGS. 11A and 11B, the anteriorly-extending retainer-engaging projections 24 and the posteriorly-extending projections 22 are preferably integrally formed or connected so as to form U-shaped, laterally extending projections as at 26. The retainer structures 70 are thus also preferably U-shaped in transverse cross-section as can be seen from a general inspection of FIGS. 11A and 11B for cooperably engaging the U-shaped, laterally extending projections 26 and for enhancing support of the housing assembly adjacent the mounting surface.

The U-shaped, laterally extending projections 26 are preferably formed at laterally opposed portions 202 of the peripheral housing edging 205 relatively nearer the housing top 200 as compared to the housing bottom 201. The retainer structures 70 each comprise a retainer structure length as at 103, which retainer structure lengths 103 are preferably oriented or spatially positioned equidistant intermediate the housing top 200 and housing bottom 201 when in engagement with the U-shaped, laterally extending projections 26 for enhancing support of the housing assembly adjacent the mounting surface. The described equidistant placement of the structural lengths 103 intermediate the housing top 200 and the housing bottom 201 provides for better balance of the backlit graphic display device 10 when mounted to the mounting surface 100, and thus is believed to enhance support of the housing assembly adjacent the window or mounting surface 100.

As indicated, the backlit graphic display device 10 can be mounted with respect to a mounting surface window 100 to display desired graphics for general amusement, marketing applications, safety applications and/or emergency situations, for example. The backlit graphic display device 10 according to the present invention can provide highly visible graphics that other motorists and/or pedestrians and/or bystanders and/or passersby will be able to see in adverse weather conditions, for example.

As indicated above, in certain embodiments of this invention, the elements of backlit graphic display device 10 can have any suitable overall and/or cross-sectional shape and/or can be configured in any suitable relationship. It is possible to provide a layered configuration wherein each element layer is laminated, such as during manufacture or construction, to preferably but not necessarily produce an apparatus or device having a relatively slim design.

It is also possible to provide a backer plate configuration, wherein elements are integrated with, affixed to and/or connected to a backer plate, such as an injection molded backer plate. It is also possible to provide a backer housing configuration, wherein elements are integrated with, affixed to and/or connected to a module, such as an injection molded module. In each configuration, subassemblies can be mounted at any suitable location to dedicated or available surfaces.

In certain embodiments of this invention, backlit graphic display device 10 may include any number of the components discussed in this and previous specifications that have been incorporated herein by reference thereto, in addition to other suitable or interchangeable components known to those skilled in the art. For example, the on/off switch 13 can providing multiple position switching including an off position, a motion-on position, a motion-off position, and/or a constant operation position. Mode switch 13 can be used to select a position that operates backlit graphic display device 10 within any necessary regulation or limited parameter.

The device 10 may be preferably outfitted with various sensors, including a dim switch or sensor, a motion sensor, and/or a light sensor. The dim switch or sensor can include settings to adjust a lumens output level, as desired, for example to conform to any local ordinance, such as vehicle regulations within a particular jurisdiction. The motion sensor can comprise any suitable sensor, such as a spring-type sensor, a rocker-type sensor, an accelerometer, a speedometer, a directional sensor and/or a position sensor. The light sensor preferably communicates with control module to provide appropriate power for proper operation of backlit graphic display device 10, depending upon the time of day and/or weather conditions, such as darkness, cloudiness, rain, snow and/or fog.

In certain embodiments of this invention, the control module can evaluate each sensed signal, process each sensed signal according to programmed steps, and then emit one or more output signals, each of which can include information, for example information to set a power rate at zero, partial power or full power. In one embodiment of this invention, an internal timer switch can work or cooperate with motion switch and activate at least one illumination switch to an on position, an off position or a partially powered position, after a determined time period has passed, for example a five (5) minute time period, based on a manual and/or an automatic mode determination and setting. The backlit graphic display device 10 can also include a sound or noise sensor, a vibration sensor and/or a temperature sensor or switch.

Backlit graphic display device 10 can be constructed to achieve specifically desired illuminated graphics in a user-friendly manner, the extent to which can be a function of the programming of the control module. In certain embodiments of this invention, backlit graphic display device 10 requires relatively little user input and can be used to achieve the display of critical information, such as safety and hazard information, as well as non-critical information, such as identifying membership in an organization or providing a graphic message.

The housing assembly can be permanently or detachably secured with respect to any mounting surface, such as a glass window. In certain embodiments according to this invention, housing is detachably secured with a hook and loop fastener, such as a VELCRO® brand hook and loop type fastening means, and/or any suitable mechanical connector. In other embodiments according to this invention, double sided tape or another suitable adhesive, such as glue or adhesion strips as exemplary for the adhesion elements 32 can be used to attach housing with respect to the mounting surface 100 via the mounts 70.

In other embodiments according to this invention, the housing can be removably mounted using suction cups structurally attached to or with respect to housing. For example, tabs or other inserts can be mounted within any corresponding void to secure housing with respect to a suction cup. Plates, including wafer plates and die stamp thin metal plates, or injection molded plates or other shapes, can be used to mount or otherwise fasten housing with respect to the mounting surface 100. Magnetic plates can also be used to mount housing with respect to the mounting surface 100 via the mounts 70.

It is noted that certain users may wish to refrain from attaching the device 10 to a mounting surface as exemplified by a window 100. In this regard, the device further contemplates the incorporation of certain select device-supporting means, which select device-supporting means may well function to support the backlit graphic display device 10 adjacent a window 100 such that the light from the light source is guided in the anterior direction 102. The select device-supporting means may be preferably selected from the group consisting of device-to-surface retainer structures as at 70 for fastening the graphic display device to a mounting surface and a device stand structure as at 90.

The device stand 90 according to the present invention preferably comprises laterally opposed anterior housing support members 91 and a posterior housing support member 92. The housing assembly is received intermediate the anterior housing support members 91 and the posterior housing support member 92 when supported via the device stand 90 upon a support surface as at 101. The anterior housing support members 91 and the posterior housing support member 92 are preferably triangularly shaped for enhancing support of the housing assembly upon the support surface 101.

While the above description contains much specificity, this specificity should not be construed as limiting the scope of the invention, but rather as an exemplification of the invention. In this last regard, it is contemplated that the present invention can be used for a variety of applications including, but not limited to, safety signals, public service symbols, such as the Department of Transportation, the Military, the National Guard, the Police and the Fire Department logos or plaques, construction locations and workers, zone authorities, help/warning messages, and other suitable informational and/or marketable applications, such as zone parking passes for major events, promotional icons, brand logos, animated images, dynamic images, wave images, and advertising messages.

Throughout these specifications, the phrase illuminated graphics panel, the phrase electroluminescent display device, the phrase electroluminescent display, the phrase electroluminescent device and the phrase electroluminescent element, the phrase light emitting diode (LED), the phrase lighting device, the phrase lighting apparatus, as well as other similar phrases, are intended to be interchangeable with each other. The phrase illuminated graphics panel or any of the other interchangeable phrases each is intended to relate to a lighting device that includes panel shaped elements or segments which can be lit by any suitable light supply or source. The phrase illuminated graphics panel and the interchangeable phrases are also intended to relate to and include currently available EL lighting devices, as well as EL devices or other suitable lighting devices that may become available.

In certain embodiments of this invention, the illuminated graphics panel may be designed and/or manufactured with light emitting diode (LED) technology, which can provide cost savings. Any suitable type of LED can be used, including but not limited to a pointing LED, a wide beam LED, a side firing LED and/or an organic LED (OLED). For example, it may be possible to diffuse LED lights into panels, dedicated panels and/or dedicated panel segments, which can be of any suitable material and have any suitable dimensions, cross section and/or shape.

The present invention may be said to preferably and essentially provide a (backlit) graphic display device for illuminating interchangeable graphic panels, which backlit graphic display device preferably and essentially comprises a housing assembly, a light source assembly, a light guide assembly, and certain select device-supporting means, which select device-supporting means may well function to support the graphic display device 10 adjacent a window 100 such that the light from the light source is guided in the anterior direction 102 for viewing by passersby.

The housing assembly preferably and essentially comprises a housing top as at 200, a housing bottom as at 201, laterally opposed housing sides as at 202, a housing back as at 203, a housing front as at 204, and peripheral housing edging 205. The housing back 203 preferably and essentially comprises or defines an assembly-receiving cavity or void as at 206. The light source assembly preferably and essentially comprises, in electrical communication, an external power source; a light source as exemplified by LED type light elements provided in light strips 16; and circuitry as exemplified by conductor(s) 14/15, terminals, PC board, and a control module.

A light guide assembly according to the present invention preferably comprises light guide panel or light guide as at 17 outfitted with the light strips 16 in edge adjacency thereto, which light strips 16 may be both covered and fastened to the panel 17 via light strip covers 18. The light guide assembly is positionable in edge adjacency to the light source for guiding and/or re-directing light emanating from the light source in an anterior direction as at 102, which anterior direction 102 is orthogonal to a light guide plane of the light guide panel 17.

The backlit graphic display device 10 according to the present invention basically functions to illuminate interchangeable graphic panels, and is believed to essentially comprise: a housing assembly, a light guide assembly, and certain select device-supporting means. The housing assembly preferably comprises a housing top, a housing bottom, laterally opposed housing sides, a housing back, a housing front, and peripheral housing edging. The housing back preferably further comprises or defines a lens-receiving volume in anterior adjacency to an assembly-receiving cavity. The housing back further preferably comprises lens-guiding ribs, which lens-guiding ribs providing boundaries to the assembly-receiving cavity.

The light guide assembly preferably comprises a light source and a light guide panel. The light guide assembly is received in the assembly-receiving cavity adjacent the peripheral housing edging. The light guide is positioned in edge adjacency to the light source for guiding light from the light source in an anterior direction orthogonal to a light guide plane of the light guide.

The select device-supporting means for supporting the graphic display device such that the light from the light source is guided in the anterior direction. The select device-supporting means may be exemplified by and selected from the group consisting of device-to-surface retainer structures as at 70 for fastening the graphic display device to a mounting surface as at 100, and a device stand structure as at 90 for supporting the graphic display device upon a support surface as at 101.

When used in combination with the retainer structures 70, the housing back 203 may preferably comprise integrally formed, laterally opposed, posteriorly-extending retainer-engaging projections, which posteriorly-extending retainer-engaging projections engage upper posterior portions of the retainer structures. Together, the posteriorly-extending retainer-engaging projections and retainer structures enhance support of the housing assembly adjacent the mounting surface.

The housing front 204 may preferably comprise integrally formed, laterally opposed, anteriorly-extending retainer-engaging projections. The anteriorly-extending retainer-engaging projections engage upper anterior portions of the retainer structures such that the anteriorly-extending retainer-engaging projections and retainer structures enhance support of the housing assembly adjacent the mounting surface.

The anteriorly-extending retainer-engaging projections and posteriorly-extending projections may be preferably integrally formed so as to form U-shaped, laterally extending projections. The retainer structures are further preferably U-shaped in transverse cross-section for cooperably engaging the U-shaped, laterally extending projections for further enhancing support of the housing assembly adjacent the mounting surface.

The U-shaped, laterally extending projections are formed at laterally opposed portions of the peripheral housing edging relatively nearer the housing top as compared to the housing bottom. In this regard, the retainer structures each preferably comprise a retainer structure length, which retainer structure lengths are equidistant intermediate the housing top and housing bottom when in engagement with the U-shaped, laterally extending projections for enhancing support of the housing assembly adjacent the mounting surface.

Accordingly, although the invention has been described in detail in connection with certain embodiments or examples, which illustrate or simulate various aspects involved in the practice of this invention, it is to be understood that all changes that come within the spirit of this invention are desired to be protected as claimed hereinafter, and thus this invention is not to be construed as limited by example or embodiment.

We claim:

1. A graphic display device for illuminating interchangeable graphic panels, the graphic display device comprising:
   a housing assembly, the housing assembly comprising a housing top, a housing bottom, laterally opposed housing sides, a housing back, and a housing front, the housing back comprising an assembly-receiving cavity and a lens-receiving volume in anterior adjacency to the assembly-receiving cavity, the housing back comprising lens-guiding ribs and integrally formed, laterally opposed, posteriorly-extending retainer-engaging projections, the lens-guiding ribs providing boundaries to the assembly-receiving cavity and lens-receiving volume;
   a light guide assembly, the light guide assembly comprising a light source and a light guide panel, the light guide assembly being received in the assembly-receiving cavity, the light guide panel being positioned in edge adjacency to the light source for guiding light from the light source in an anterior direction orthogonal to a light guide plane of the light guide panel; and
   laterally opposed device-to-surface retainer structures for fastening the graphic display device to a mounting surface, the device-to-surface retainer structures each comprising an edge-receiving void, the edge-receiving voids for binding to laterally opposed portions of the housing assembly, the posteriorly-extending retainer-engaging projections for engaging upper posterior portions of the retainer structures, the retainer structures thus for supporting the housing assembly such that the light from the light source is guided in the anterior direction, the posteriorly-extending retainer-engaging projections and retainer structures for enhancing support of the housing assembly adjacent the mounting surface, the anterior direction being orthogonal to the mounting surface.

2. The graphic display device of claim 1 wherein the housing front comprises integrally formed, laterally opposed, anteriorly-extending retainer-engaging projections, the anteriorly-extending retainer-engaging projections for engaging upper anterior portions of the retainer structures, the anteriorly-extending retainer-engaging projections and retainer structures for enhancing support of the housing assembly adjacent the mounting surface.

3. The graphic display device of claim 2 wherein the anteriorly-extending retainer-engaging projections and posteriorly-extending projections are integrally formed so as to form U-shaped, laterally extending projections, the retainer structures being U-shaped in transverse cross-section for cooperably engaging the U-shaped, laterally extending projections and for enhancing support of the housing assembly adjacent the mounting surface.

4. The graphic display device of claim 3 wherein the U-shaped, laterally extending projections are formed at laterally opposed portions of the peripheral housing edging relatively nearer the housing top as compared to the housing bottom, the retainer structures each comprising a retainer structure length, the retainer structure lengths being equidistant intermediate the housing top and housing bottom when in engagement with the U-shaped, laterally extending projections enhancing support of the housing assembly adjacent the mounting surface.

5. The graphic display device of claim 1 comprising, in combination, at least one graphic lens, the at least one graphic lens being insertable into the housing assembly in adjacency to the lens-guiding ribs.

6. The graphic display device of claim 1 wherein the assembly-receiving cavity and the light guide assembly comprise cooperable assembly-to-cavity retention means for retaining the light guide assembly within the assemblyreceiving cavity when received therein.

7. The graphic display device of claim 1 wherein the light guide assembly comprises at least one light source cover, the at least one light source cover for simultaneously covering the light source and fastening the light source in edge adjacency to the light guide, the at least one light source cover thus for retaining the light guide assembly in assembled relation within the assembly-receiving cavity.

8. A graphic display device for illuminating interchangeable graphic panels, the graphic display device comprising:
 a housing assembly, the housing assembly comprising a housing top, a housing bottom, laterally opposed housing sides, a housing back, and a housing front, the housing back comprising an assembly-receiving cavity and a lens-receiving volume in anterior adjacency to the assembly-receiving cavity, the housing back comprising and integrally formed laterally opposed, posteriorly-extending projections;
 a light guide assembly, the light guide assembly comprising a light source and a light guide panel, the light guide assembly being received in the assembly-receiving cavity, the light guide being positioned in edge adjacency to the light source for guiding light from the light source in an anterior direction orthogonal to a light guide plane of the light guide panel; and
 select device-supporting means, the posteriorly-extending projections for engaging upper posterior portions of the select device-supporting means, the posteriorly-extending projections and the select device-supporting means for supporting the graphic display device such that the light from the light source is guided in the anterior direction.

9. The graphic display device of claim 8 wherein the select device-supporting means are selected from the group consisting of device-to-surface retainer structures for fastening a graphic display device to a mounting surface and a device stand structure for supporting the graphic display device upon a support surface.

10. The graphic display device of claim 9 wherein the device stand comprises laterally opposed anterior housing support members and a posterior housing support member, the housing assembly being received intermediate the anterior housing support members and the posterior housing support member when supported via the device stand upon a support surface.

11. The graphic display device of claim 10 wherein the anterior housing support members and the posterior housing support member are triangularly shaped, the triangularly shaped anterior housing support members and posterior housing support member for enhancing support of the housing assembly upon the support surface.

12. The graphic display device of claim 8 wherein the housing front comprises integrally formed, laterally opposed, anteriorly-extending projections, the anteriorly-extending projections for engaging upper anterior portions of the select device-supporting means, the anteriorly-extending projections and select device-supporting means for enhancing support of the housing assembly.

13. The graphic display device of claim 12 wherein the anteriorly-extending projections and posteriorly-extending projections are integrally formed so as to form U-shaped, laterally extending projections, the select device-supporting means comprising retainer structures, the retainer structures being U-shaped in transverse cross-section for cooperably engaging the U-shaped, laterally extending projections and for enhancing support of the housing assembly.

14. The graphic display device of claim 13 wherein the U-shaped, laterally extending projections are formed at laterally opposed portions of the peripheral housing edging relatively nearer the housing top as compared to the housing bottom, the retainer structures each comprising a retainer structure length, the retainer structure lengths being equidistant intermediate the housing top and housing bottom when in engagement with the U-shaped, laterally extending projections enhancing support of the housing assembly.

15. The graphic display device of claim 8 comprising, in combination, at least one graphic lens, the at least one graphic lens being insertable into the housing assembly in adjacency to the lens-guiding ribs.

16. The graphic display device of claim 8 wherein the assembly-receiving cavity and the light guide assembly comprise cooperable assembly-to-cavity retention means for retaining the light guide assembly within the assembly-receiving cavity when received therein.

17. The graphic display device of claim 8 wherein the light guide assembly comprises at least one light source cover, the light source cover for simultaneously covering the light source and fastening the light source in edge adjacency to the light guide, the light source cover thus for retaining the light guide assembly in assembled relation within the assembly-receiving cavity.

18. A graphic display device for illuminating interchangeable graphic panels, the graphic display device comprising:
 a housing assembly, the housing assembly comprising a housing top, a housing bottom, opposed housing sides, a housing back, a housing front, and opposed, support-engaging projections, the housing assembly defining an assembly-receiving cavity and a lens-receiving volume in anterior adjacency to the assembly-receiving cavity;
 a light guide assembly, the light guide assembly comprising at least one light source cover, a light source, and a light guide panel, the light guide assembly being received in the assembly-receiving cavity, the light guide being positioned in edge adjacency to the light source for guiding light from the light source in an anterior direction orthogonal to a light guide plane of the light guide panel, the light source cover for simultaneously covering the light source and fastening the light source in edge adjacency to the light guide panel, the light source cover thus for retaining the light guide assembly in assembled relation within the assembly-receiving cavity; and select device-supporting means, the select device-supporting means and opposed, support-engaging projections being cooperable for supporting the graphic display device in a spatial position such that the light from the light source is guided in a select direction.

* * * * *